(12) United States Patent
Nakagami et al.

(10) Patent No.: US 8,827,029 B1
(45) Date of Patent: Sep. 9, 2014

(54) BULLDOZER

(71) Applicant: Komatsu Ltd., Tokyo (JP)

(72) Inventors: Hiroshi Nakagami, Hirakata (JP); Taira Ozaki, Ikoma (JP); Hironori Yamamitsu, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/005,981

(22) PCT Filed: Mar. 29, 2013

(86) PCT No.: PCT/JP2013/059554
§ 371 (c)(1),
(2), (4) Date: Sep. 18, 2013

(51) Int. Cl.
*B60K 13/04* (2006.01)
*E02F 9/08* (2006.01)

(52) U.S. Cl.
CPC .................................. *E02F 9/0866* (2013.01)
USPC .......... 180/309; 180/296; 180/89.2; 180/89.1

(58) Field of Classification Search
CPC ........ B60K 13/00; B60K 13/02; B60K 13/04; B60K 11/00; B60K 11/02; B60K 11/04; B60K 5/00
USPC .............. 180/296, 309, 89.2, 68.3, 68.1, 69.2
See application file for complete search history.

(56) References Cited

U.S. PATENT DOCUMENTS

| | | | |
|---|---|---|---|
| 4,454,926 A | * | 6/1984 | Akins .......................... 180/68.1 |
| 4,548,166 A | * | 10/1985 | Gest .......................... 123/198 E |
| 2010/0187383 A1 | * | 7/2010 | Olsen et al. ................... 248/201 |

FOREIGN PATENT DOCUMENTS

| | | | | |
|---|---|---|---|---|
| JP | 2002-21565 A | | 1/2002 | |
| JP | 2005-113674 A | | 4/2005 | |
| JP | 2012-30736 A | | 2/2012 | |
| WO | WO2012017845 | * | 2/2012 | ............. B60K 11/04 |

OTHER PUBLICATIONS

International Search Report for PCT/JP2013/059554, issued on Jul. 2, 2013.

* cited by examiner

*Primary Examiner* — Hau Phan
*Assistant Examiner* — Bryan Evans
(74) *Attorney, Agent, or Firm* — Global IP Counselors, LLP (57) ABSTRACT

In the engine compartment of a bulldozer the radiator is arranged forward of the engine. An exhaust gas treatment unit is arranged above the engine. A first exhaust gas treatment device of the exhaust gas treatment unit is arranged such that the longitudinal direction of the first exhaust gas treatment device follows the forward-backward direction of the vehicle. A second exhaust gas treatment device of the exhaust gas treatment unit is positioned to the side of the first exhaust gas treatment device, and arranged such that the longitudinal direction of the first exhaust gas treatment device follows the forward-backward direction of the vehicle. The air cleaner is arranged between the radiator and the exhaust gas treatment unit in the forward-backward direction of the vehicle.

20 Claims, 6 Drawing Sheets

BULLDOZER

CROSS-REFERENCE TO RELATED APPLICATIONS

This application is a U.S. National stage application of International Application No. PCT/JP2013/59554.

BACKGROUND

Field of the Invention

The present invention relates to a bulldozer.

In recent years bulldozers are being mounted with a high level exhaust gas treatment device in order to protect the environment. An exhaust gas treatment device is a device that purifies exhaust gas from an engine. An exhaust gas treatment device may be for example, a device that lowers the level of nitrogen oxide (NOx), a device that lowers the level of carbon monoxide (CO) or a device that removes particulate matter. In the diesel engine exhaust gas treatment system disclosed in U.S. Pat. No. 8,141,535 for example, two exhaust gas treatment devices are arranged above the engine together with an air cleaner. The direction in which these exhaust gas treatment devices are arranged is such that the longitudinal direction of the device intersects with the longitudinal direction of the engine.

SUMMARY

In a bulldozer the engine and exhaust gas treatment device are arranged in the engine compartment. The engine is disposed such that the longitudinal direction thereof follows the forward-backward direction of the vehicle. A cab is arranged to the rear of the engine compartment. A work implement including a blade and the like is arranged forward of the engine compartment.

In a conventional exhaust gas treatment device, as described above, a plurality of exhaust gas treatment devices are provided as high level exhaust gas treatment capabilities are required. Further, each of the exhaust gas treatment devices is of substantial size. In order to provide a plurality of exhaust gas treatment devices in the engine compartment, if an exhaust gas treatment device is disposed above the engine as in the case disclosed in U.S. Pat. No. 8,141,535, in the bulldozer, the exhaust gas treatment device is arranged such that the longitudinal direction thereof follows the widthwise direction of the vehicle. For this reason the engine compartment comes to be of substantially large dimensions in the widthwise direction of the vehicle. The engine compartment being of substantially large dimensions in the widthwise direction of the vehicle may cause a deterioration in visibility from the cab in the forward direction. For example, when an operator operates the bulldozer while viewing the left and right ends of the blade from the cab, the field of vision from the operator to the blade may be obstructed by the engine compartment.

Moreover, a radiator is arranged in the engine compartment. In order to suppress increasing size of the vehicle body of a bulldozer it is preferable for the engine, exhaust gas treatment device and the radiator to be arranged compactly within the engine compartment. If an exhaust gas treatment device is arranged in close proximity to the radiator however, the radiator receives a substantial heat effect from the exhaust gas treatment device as that device heats up.

An object of the present invention is to provide a bulldozer that enables improved performance in the treatment of exhaust gas, that avoids the effect of heat from an exhaust gas treatment device impacting the radiator and moreover, that suppresses decreased visibility from the cab in the forward direction.

A bulldozer according to a first aspect of the invention herein disclosed, provides a cab, an engine compartment, an engine, a radiator, an exhaust gas treatment unit, and an air cleaner. The engine compartment is arranged forward of the cab. The engine is arranged in the engine compartment. The radiator is arranged forward of the engine. The exhaust gas treatment unit is arranged above the engine. The exhaust gas treatment unit has a first exhaust gas treatment device and a second exhaust gas treatment device. The first exhaust gas treatment device is arranged such that the longitudinal direction thereof follows the forward-backward direction of the vehicle. The second exhaust gas treatment device is positioned to the side of the first exhaust gas treatment device, arranged such that the longitudinal direction thereof follows the forward-backward direction of the vehicle. The air cleaner is arranged between the radiator and the exhaust gas treatment unit in the forward-backward direction of the vehicle.

In this bulldozer, the first exhaust gas treatment device and the second exhaust gas treatment device are arranged such that the longitudinal direction of these devices follows the forward-backward direction of the vehicle (hereinafter this arrangement is referred to as "vertical arrangement"). For this reason, even though the dimensions of the first exhaust gas treatment device and the second exhaust gas treatment device are substantial in the longitudinal direction, an increase in the dimensions of the engine compartment in the widthwise direction can be avoided. Accordingly, this bulldozer realizes improved performance in treatment of exhaust gas and suppresses the problem of reduced visibility from the cab in the forward direction.

Further, the air cleaner is arranged between the radiator and the exhaust gas treatment unit in the forward-backward direction of the vehicle. Accordingly, even though the first exhaust gas treatment device and the second exhaust gas treatment device are disposed in the vertical arrangement, a substantial distance can be maintained between the exhaust gas treatment unit and the radiator. For this reason, the effect of heat from the exhaust gas treatment unit impacting the radiator can be avoided.

It may be suitable for at least a part of the air cleaner to be positioned forward the engine. This means substantial space can be maintained above the engine for arranging the exhaust gas treatment unit.

Note that if the dimensions of each of the exhaust gas treatment devices become substantial, it is difficult to arrange above the engine, all of, an air cleaner and a plurality of exhaust gas treatment devices. Thus an arrangement is conceivable in which an exhaust gas treatment device is arranged following the forward-backward direction of the engine compartment, with part of the exhaust gas treatment device projecting forward from the engine in the planar view. Due to considerations of weight balance affecting the engine mounts however, it is not preferable that an exhaust gas treatment device, being heavy, be disposed projecting beyond the engine. In the bulldozer according to this aspect of the present invention, at least part of the air cleaner being arranged forward the engine, a plurality of exhaust gas treatment devices as well as the air cleaner can easily be arranged above the engine. This also avoids the problem of weight balance affecting the engine mounts.

It may be preferable for the bulldozer to provide a cooling device. The cooling device is arranged to the rear of the radiator, moreover below the top portion of the radiator. It may be suitable for at least part of the air cleaner to be positioned directly above the cooling device. This enables a reduction in the size of the engine compartment in the forward-backward direction of the vehicle.

It may be suitable for the air cleaner to be supported by a panel on the upper face of the engine compartment. With this arrangement, as the air cleaner is of light weight in comparison to the exhaust gas treatment device, even though the air cleaner is at least partially positioned forward the engine, the air cleaner can be firmly supported.

It may be suitable for the exhaust gas treatment unit to be supported by the engine. With this arrangement, the exhaust gas treatment unit can be firmly supported.

It may be suitable for the air cleaner to be arranged such that the longitudinal direction thereof intersects with the forward-backward direction of the vehicle. This arrangement enables a reduction in the size of the engine compartment in the forward-backward direction of the vehicle.

It may be suitable for the engine compartment to have an opening and a side panel. The opening is positioned to the side of the air cleaner. The side panel is disposed so as to enable the opening and closing of the opening. It may be suitable for the air cleaner to be disposed at an inclination relative to the widthwise direction of the vehicle. It may be suitable for the air cleaner to have a first side portion positioned close to the side panel and a second side portion positioned further from the side panel. It may be suitable for the first side portion to be arranged so as to overlap with the side panel, viewed from the side of the vehicle.

In this case, by opening the side panel, the first side portion of the air cleaner can be easily accessed from the opening. This enables the air cleaner to be of substantial length and facilitates easy maintenance of the air cleaner.

It may be suitable for the air cleaner to be arranged such that an extension line of the center axial line of the air cleaner passes through the opening. In this case, by causing the air cleaner to move in the direction of the center axial line thereof, the air cleaner can be easily taken out from the opening.

It may be suitable for the engine to have an exhaust gas port and an air suction port. The exhaust gas port is connected to the exhaust gas treatment unit. The air suction port is connected to the air cleaner. The exhaust gas port is positioned behind the air suction port.

In this arrangement, in comparison to the case in which the exhaust gas port is positioned forward the air suction port, the exhaust gas treatment unit can be arranged to the rear. This enables the distance between the radiator and the exhaust gas treatment unit to be expanded.

Effects of the Invention

In the bulldozer according to the invention herein disclosed, processing performance of exhaust gas is improved and a reduction in visibility from the cab in the forward direction is avoided. Further, the effect of heat from the exhaust gas treatment unit impacting the radiator is avoided.

DETAILED DESCRIPTION OF EMBODIMENT(S)

Figure 1:
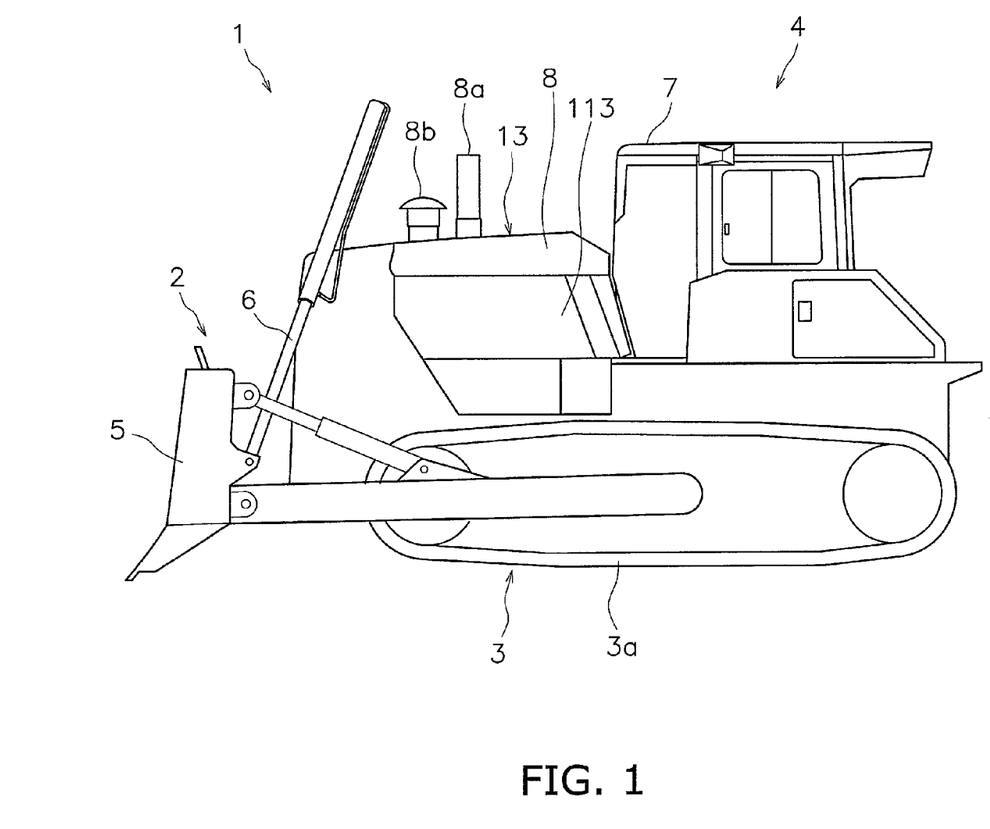
FIG. 1 provides a left side view of a bulldozer according to an embodiment of the present invention.

A bulldozer according to an embodiment of the present invention will now be described with reference to the drawings. FIG. 1 provides a left side view of a bulldozer according to an embodiment of the present invention. A bulldozer 1 provides a work implement 2, a traveling device 3 and a vehicle body 4. The traveling device 3 is a device that causes the vehicle to travel, and has crawler tracks 3a. As the crawler tracks 3a are driven, the bulldozer 1 travels.

The vehicle body 4 includes a cab 7 and an engine compartment 8. The engine compartment 8 is positioned forward of the cab 7. In this embodiment of the present invention forward, rear, and left and right refer to how each of these is seen from the point of view of an operator in the cab 7.

The work implement 2 is provided forward of the engine compartment 8. The work implement 2 has a blade 5 and hydraulic cylinders 6. The blade 5 is provided such that it is able to swing in the upward-downward direction. The hydraulic cylinders 6 change the posture of the blade 5.

Figure 2:
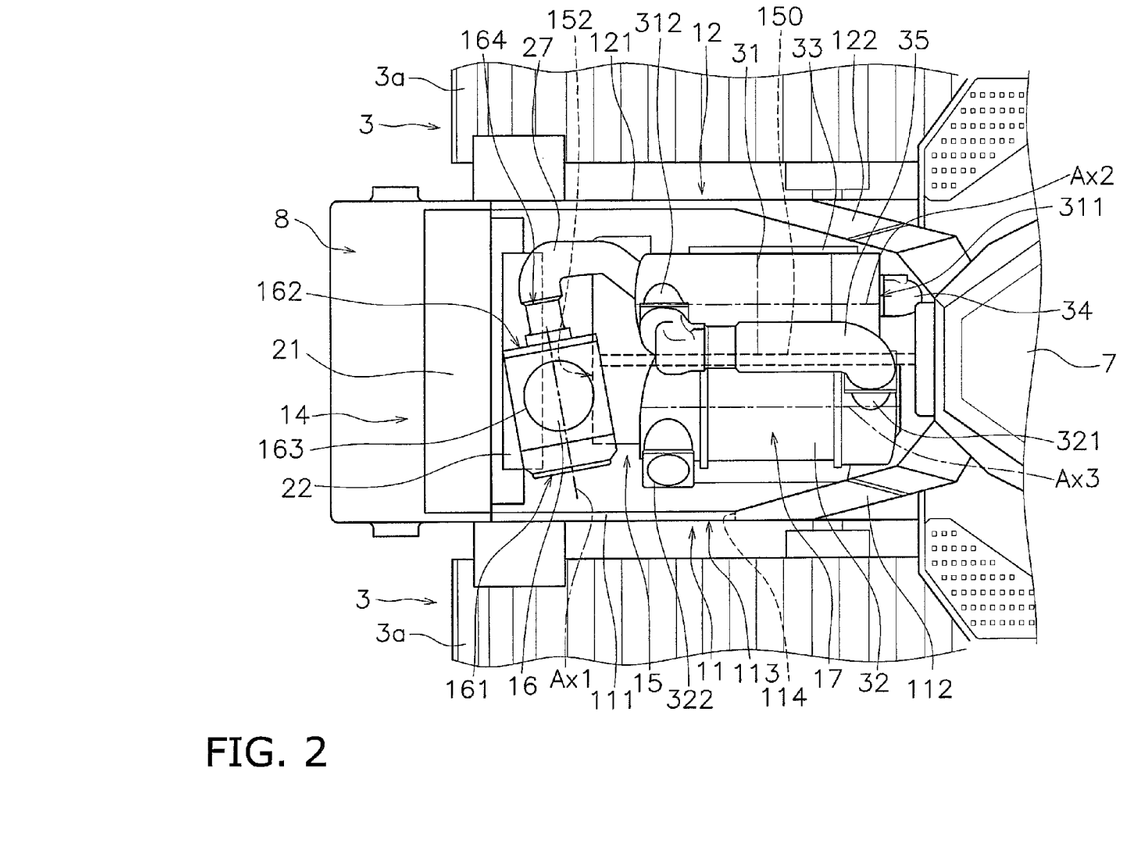
FIG. 2 is a plan view showing the configuration of the engine compartment of the bulldozer.
Figure 3:
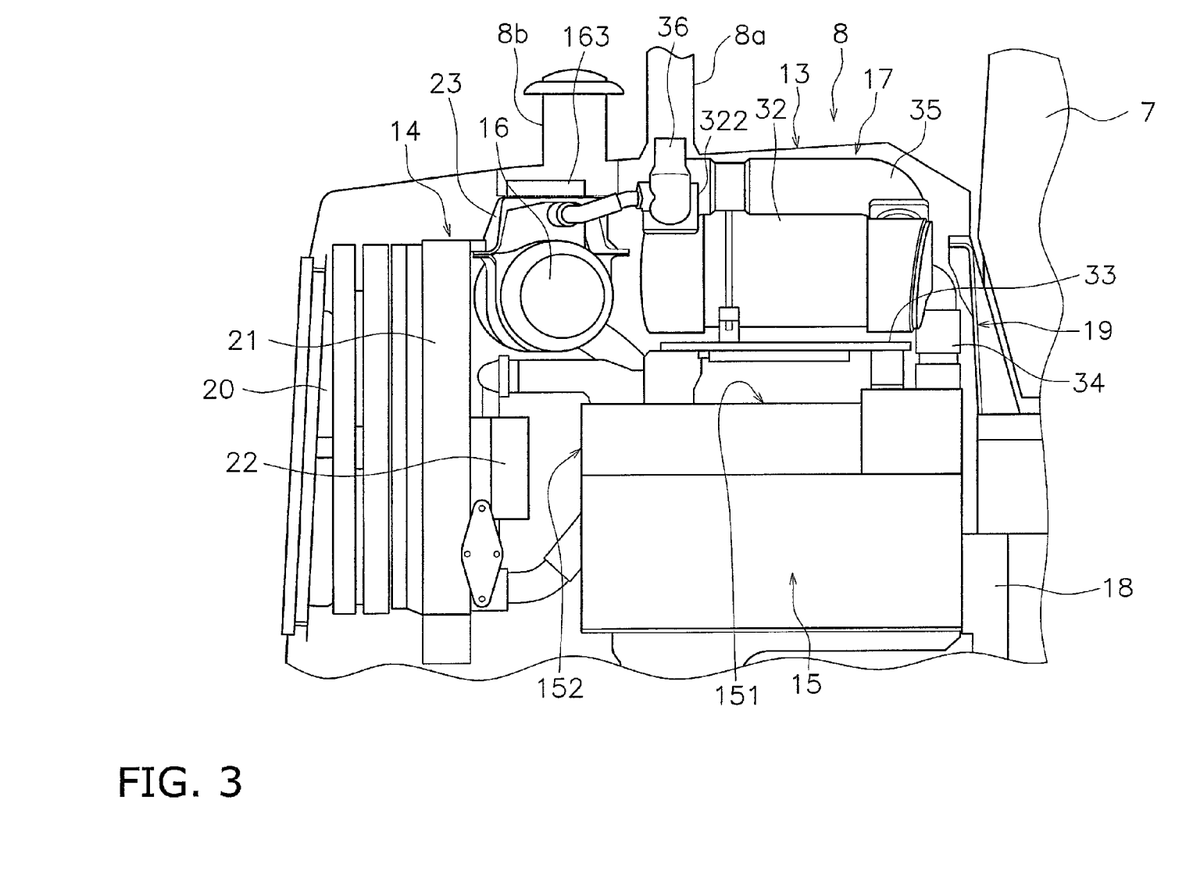
FIG. 3 is a left side view showing the configuration of the engine compartment.

FIG. 2 is a plan view showing the configuration of the engine compartment 8. FIG. 3 is a left side view showing the configuration of the engine compartment 8. To facilitate ease of understanding, in FIG. 2 and FIG. 3 some of the parts within the engine compartment 8 are not shown.

As shown in FIG. 2, the engine compartment 8 has a first side face 11 and a second side face 12. In this embodiment of the present invention, the first side face 11 is the left side face of the engine compartment 8. The second side face 12 is the right side face of the engine compartment 8. The first side face 11 has a first planar section 111 and a first inclined face section 112. In the planar view of the vehicle, the first planar section 111 is disposed extending in the forward-backward direction. The first inclined face section 112 is arranged to the rear of the first planar section 111.

The second side face 12 has a second planar section 121 and a second inclined face section 122. In the planar view of the vehicle, the second planar section 121 is arranged extending in the forward-backward direction. The second inclined face section 122 is arranged to the rear of the second planar section 121. In the planar view of the vehicle the first inclined face section 112 and the second inclined face section 122 are arranged at an inclination such that the gap between them decreases in the rearward direction.

As shown in FIG. 3, the engine compartment 8 has an upper face 13. The upper face 13 of the engine compartment 8 inclines downward in the forward direction. An exhaust gas outlet 8a described subsequently, juts out upward from the upper face 13 of the engine compartment 8. Further, a head portion 8b described subsequently, juts out upward from the upper face 13 of the engine compartment 8. The upper face 13 of the engine compartment 8, the first side face 11 and the second side face 12 are each formed as panels.

As shown in FIG. 2 and FIG. 3, the bulldozer 1 has a cooling unit 14, an engine 15, an air cleaner 16 and an exhaust gas treatment unit 17. The engine 15, the cooling unit 14, the air cleaner 16, and the exhaust gas treatment unit 17 are disposed in the engine compartment 8.

The engine 15 is for example, a diesel engine. As shown in FIG. 2, the engine 15 has a crankshaft 150. The crankshaft 150 extends in the forward-backward direction of the vehicle. The engine 15 is what is known as a longitudinal engine. That is to say, the longitudinal direction of the engine is arranged following the forward-backward direction of the vehicle, and the lateral direction of the engine is arranged along the widthwise direction of the vehicle.

A flywheel housing 18 is arranged to the rear of the engine 15. A damper (not shown in the drawing) is positioned to the rear of the flywheel housing 18. The damper connects to the output shaft of the engine 15 via the flywheel housing 18.

The cooling unit 14 is arranged forward of the engine 15. The cooling unit 14 includes a cooling fan 20, a radiator 21, and a cooling device 22. The radiator 21 cools the liquid coolant of the engine 15. In this embodiment of the present invention, the cooling device 22 is an oil cooler. The cooling device 22 cools the hydraulic fluid. The radiator 21 is arranged forward of the engine 15. As shown in FIG. 3, the top portion of the radiator 21 is positioned above an upper face 151 of the engine 15. The cooling device 22 is positioned to the rear of the radiator 21. The top portion of the cooling device 22 is positioned below the top portion of the radiator 21. The cooling fan 20 generates flow of air through the cooling unit 14. The airflow generated from the cooling fan 20 flows from around the engine 15, the air cleaner 16 and the exhaust gas treatment unit 17 towards the cooling unit 14. The flow of air passes through the cooling unit 14 and is expelled outside of the engine compartment 8.

The air cleaner 16 is arranged between the radiator 21 and the exhaust gas treatment unit 17 in the forward-backward direction of the vehicle. Part of the air cleaner 16 is positioned forward the forward end portion 152 of the engine 15. Specifically, the forward end portion of the air cleaner 16 is positioned forward the engine 15. The rear end portion of the air cleaner 16 is positioned directly above the engine 15. Part of the air cleaner 16 is positioned directly above the cooling device 22. Specifically, the forward end portion of the air cleaner 16 is positioned directly above the cooling device 22.

The air cleaner 16 has a cylindrical external form. As shown in FIG. 2, the air cleaner 16 is arranged such that the longitudinal direction thereof intersects with the forward-backward direction of the vehicle. That is to say, the center axial line Ax1 of the air cleaner 16 is at an inclination relative to the forward-backward direction of the vehicle. The angle of inclination of the center axial line Ax1 of the air cleaner 16 relative to the widthwise direction of the vehicle should be for example, less than 45°.

The air cleaner 16 has a first side portion 161 and a second side portion 162. In this embodiment of the present invention, the first side portion 161 is the left side portion of the air cleaner 16. The second side portion 162 is the right side portion of the air cleaner 16. The center axial line Ax1 of the air cleaner 16 is inclined forwards from the first side portion 161 toward the second side portion 162.

The air cleaner 16 is secured to the engine compartment 8. That is to say, the air cleaner 16 is supported by the engine compartment 8. Basically, the air cleaner 16 is secured to the engine compartment 8 in a condition of being suspended from the panel of the upper face 13 of the engine compartment 8 by a bracket 23.

The air cleaner 16 has an air intake opening 163 and an air discharge opening 164. The air discharge opening 164 is provided in the top portion of the air cleaner 16. The air discharge opening 164 is connected to the head portion 8b. The air discharge opening 164 is provided in the second side portion 162 of the air cleaner 16.

Figure 4:
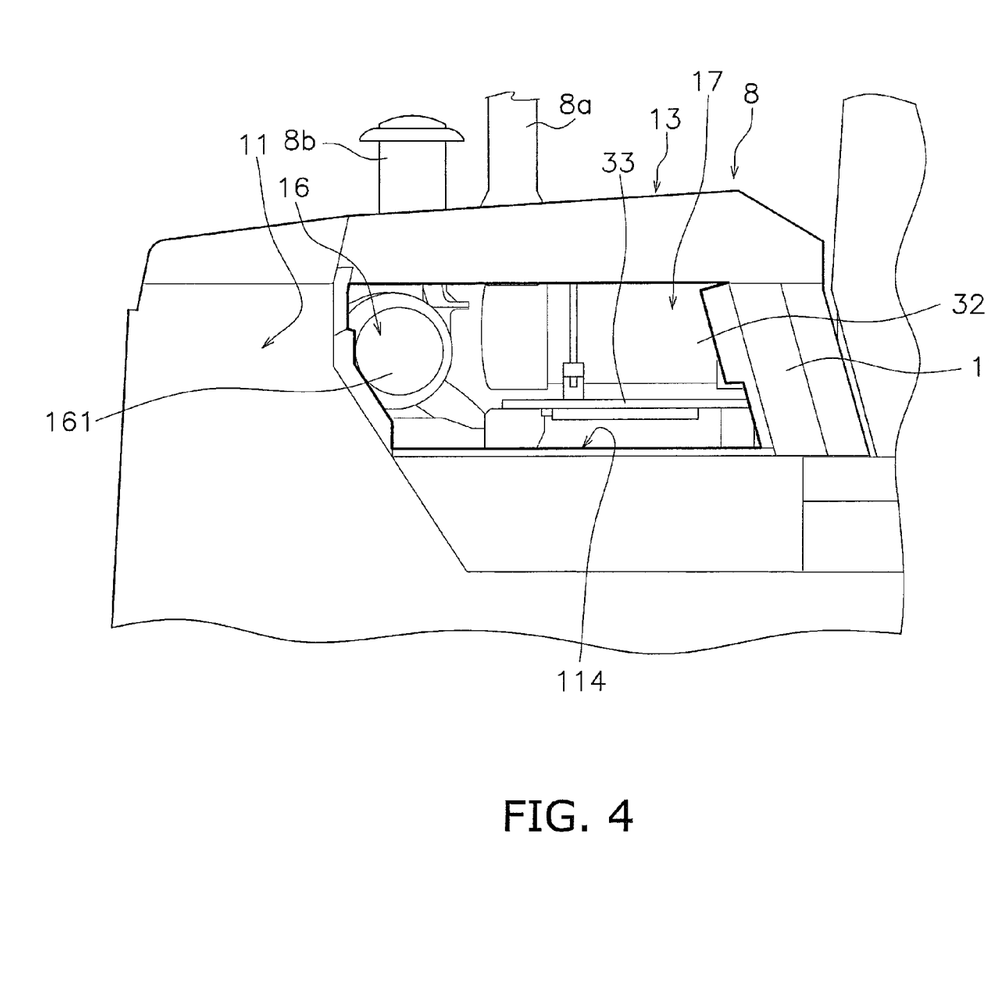
FIG. 4 is a left side view showing the engine compartment in the condition in which the side panel has been removed.

As shown in FIG. 1 the engine compartment 8 has a side panel 113. FIG. 4 is a left side view showing the engine compartment 8 in the condition in which the side panel 113 has been removed. As shown in FIG. 4 the engine compartment 8 has an opening 114. The side panel 113 and the opening 114 are provided in the first planar section 111 described above. The opening 114 is positioned to the side of the air cleaner 16. The side panel 113 is disposed so as to be able to open and close the opening 114. As shown in FIG. 2 the above described first side portion 161 is, in the air cleaner 16, the side face closest to the side panel 113. Further, the second side portion 162 is, in the air cleaner 16, the side face furthest from the side panel 113. Viewed from the side of the vehicle, the first side portion 161 is disposed so as to overlap with the side panel 113. Accordingly, as shown in FIG. 4, viewed from the side of the vehicle, with the side panel 113 in the opened condition, the first side portion 161 is visible through the opening 114. Further, as shown in FIG. 2, the air cleaner 16 is arranged such that the extension line of the center axial line Ax1 of the air cleaner 16 passes through the opening 114.

Figure 5:
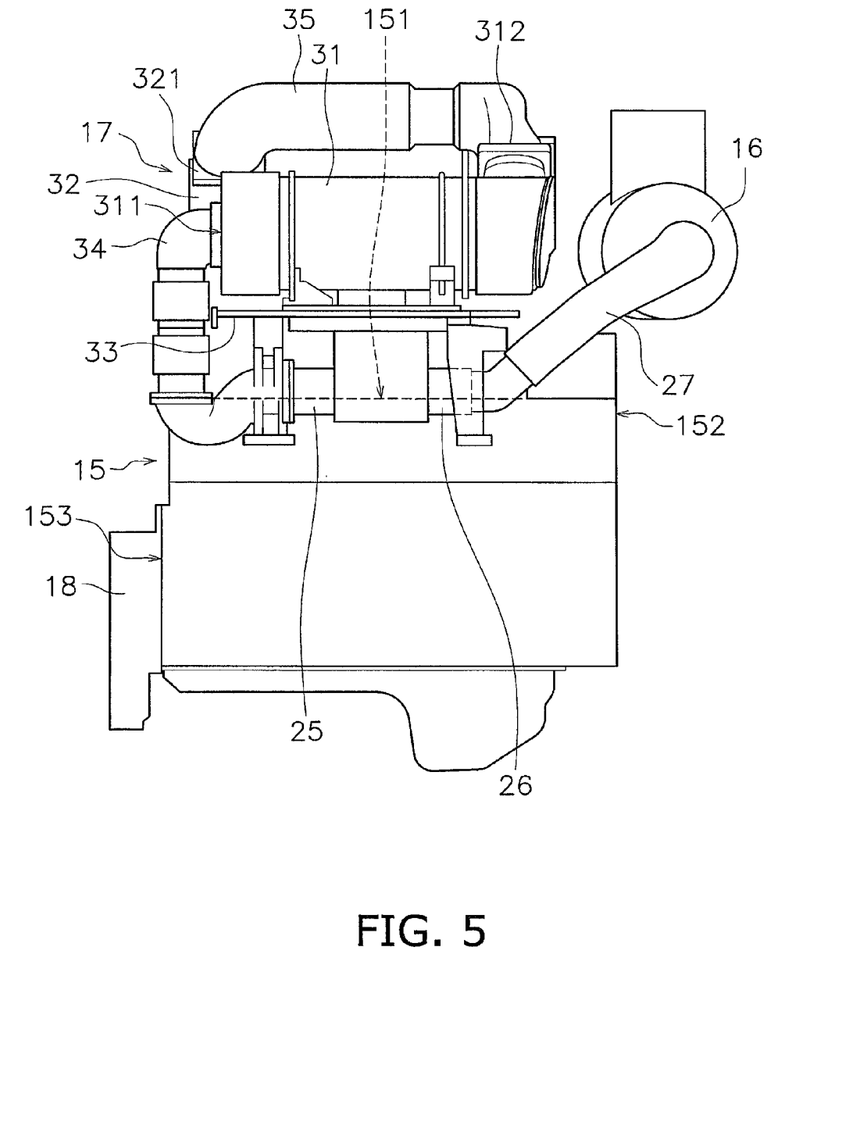
FIG. 5 is a right side view showing the engine and the peripheral devices of the engine.
Figure 6:
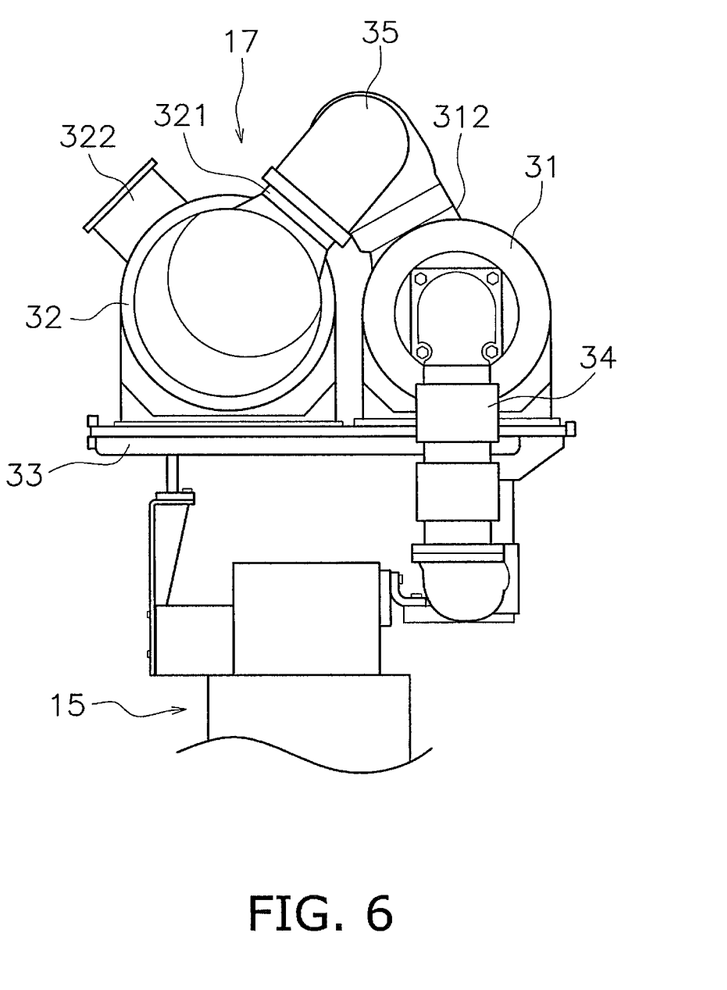
FIG. 6 is a rear view showing the engine and the peripheral devices of the engine.

FIG. 5 is a right side view showing the engine 15 and the peripheral devices of the engine 15. FIG. 6 is a rear view showing the engine 15 and the peripheral devices of the engine 15. As shown in FIG. 5, the engine 15 has an exhaust gas port 25 and an air suction port 26. The exhaust gas port 25 and the air suction port 26 are provided on the side section of the engine 15. In this embodiment, the exhaust gas port 25 and the air suction port 26 are provided on the right side section of the engine 15. The exhaust gas port 25 is positioned behind the air suction port 26. The air suction port 26 is connected to the air discharge opening 164 of the air cleaner 16 via a duct 27.

The exhaust gas treatment unit 17 is a device for cleaning exhaust gas from the engine 15. As shown in FIG. 2 and FIG. 6 the exhaust gas treatment unit 17 is positioned above the engine 15. The exhaust gas treatment unit 17 has a first exhaust gas treatment device 31 and a second exhaust gas treatment device 32.

The first exhaust gas treatment device 31 is a device for treating exhaust gas from the engine 15. In this embodiment of the present invention the first exhaust gas treatment device 31 is a diesel particulate matter collection filter device that collects particulate matter within exhaust gas by a filter. The first exhaust gas treatment device 31 incinerates the collected particulate matter in a heater attached to the filter. The first exhaust gas treatment device 31 is of substantially cylindrical external form. The first exhaust gas treatment device 31 is arranged such that the longitudinal direction thereof follows the forward-backward direction of the vehicle. That is to say, the center axial line Ax2 of the first exhaust gas treatment device 31 is positioned following the forward-backward direction of the vehicle.

The second exhaust gas treatment device 32 is a device for treating exhaust gas from the engine 15. In this embodiment of the present invention the second exhaust gas treatment device 32 is a selective reducing catalytic device that performs urea hydrolysis and selectively reduces nitrogen oxide NOx. The second exhaust gas treatment device 32 is of substantially cylindrical external form. The second exhaust gas treatment device 32 is arranged such that the longitudinal direction thereof follows the forward-backward direction of the vehicle. That is to say, the center axial line Ax3 of the second exhaust gas treatment device 32 is positioned following the forward-backward direction of the vehicle. The second exhaust gas treatment device 32 is provided to the side of the first exhaust gas treatment device 31. In this embodiment of the present invention, the second exhaust gas treatment device 32 is provided on the left side of the first exhaust gas treatment device 31.

As shown in FIG. 5, the front end portion of the first exhaust gas treatment device 31 is positioned behind the front end portion 152 of the engine 15. The rear end portion of the first exhaust gas treatment device 31 is positioned forward the rear end portion 153 of the engine 15. The rear end portion of the first exhaust gas treatment device 31 is positioned between the first inclined face section 112 and the second inclined face section 122.

As shown in FIG. 2, the front end portion of the second exhaust gas treatment device 32 is positioned behind the front end portion 152 of the engine 15. The front end portion of the second exhaust gas treatment device 32 is positioned behind the front end portion of the first exhaust gas treatment device 31. The rear end portion of the second exhaust gas treatment device 32 is positioned forward the rear end portion 153 of the engine 15. The rear end portion of the second exhaust gas treatment device 32 is positioned behind the rear end portion of the first exhaust gas treatment device 31. The rear end portion of the second exhaust gas treatment device 32 is positioned between the first inclined face section 112 and the second inclined face section 122.

As shown in FIG. 3, FIG. 5 and FIG. 6, the exhaust gas treatment unit 17 has a bracket 33. The first exhaust gas treatment device 31 and the second exhaust gas treatment device 32 are arranged above the bracket 33. The first exhaust gas treatment device 31 and the second exhaust gas treatment device 32 are secured to the bracket 33 by fixing means such as a U bolt or the like. In this way, the first exhaust gas treatment device 31, the second exhaust gas treatment device 32 and the bracket 33 are integrated. The bracket 33 is attached to the engine 15, thus the exhaust gas treatment unit 17 is supported by the engine 15.

The bulldozer 1 provides a first connecting pipe 34. The first connecting pipe 34 links the engine 15 and the first exhaust gas treatment device 31. Specifically, as shown in FIG. 5 the first exhaust gas treatment device 31 has a first connecting opening 311. The first connecting opening 311 is provided in the rear face of the first exhaust gas treatment device 31. The first connecting pipe 34 is connected to the first connecting opening 311. Further, the first connecting pipe 34 is connected to the exhaust gas port 25 of the engine 15.

The rear end portion of the first connecting pipe 34 is positioned behind the rear end portion of the second exhaust gas treatment device 32. As shown in FIG. 3, a cab 7 is provided to the rear of the first connecting pipe 34. Viewed from the side of the vehicle, a wall portion 19 is arranged between the first connecting pipe 34 and the cab 7. The wall portion 19 is the rear face of the engine compartment 8. The first connecting pipe 34 is arranged close to the wall portion 19 of the engine compartment 8. Specifically, the distance between the wall portion 19 of the engine compartment 8 and the first connecting pipe 34 is smaller than the diameter of the first connecting pipe 34.

The exhaust gas treatment unit 17 has a second connecting pipe 35. The second connecting pipe 35 connects the first exhaust gas treatment device 31 and the second exhaust gas treatment device 32. As shown in FIG. 2 and FIG. 6, the second connecting pipe 35 is disposed above the space of the gap between the first exhaust gas treatment device 31 and the second exhaust gas treatment device 32.

Specifically, the first exhaust gas treatment device 31 has a second connecting opening 312. The second connecting opening 312 projects upward in the direction toward the side of the second exhaust gas treatment device 32. The second connecting opening 312 is provided in the front portion of the peripheral surface of the first exhaust gas treatment device 31. The second connecting pipe 35 is connected to the second connecting opening 312.

The second exhaust gas treatment device 32 has a third connecting opening 321. The third connecting opening 321 is provided in the rear portion of the peripheral surface of the second exhaust gas treatment device 32. The third connecting opening 321 is positioned behind the second connecting opening 312. The third connecting opening 321 projects upward in the direction toward the side of the first exhaust gas treatment device 31. The second connecting pipe 35 is connected to the third connecting opening 321.

The second exhaust gas treatment device 32 has a fourth connecting opening 322. The fourth connecting opening 322 is provided in the front portion of the peripheral surface of the second exhaust gas treatment device 32. The fourth connecting opening 322 is positioned forward the third connecting opening 321. The fourth connecting opening 322 is positioned to the side of the second connecting opening 312. The fourth connecting opening 322 projects upward in the direction away from the first exhaust gas treatment device 31.

As shown in FIG. 3, the bulldozer 1 has a third connecting pipe 36. The third connecting pipe 36 is connected to the fourth connecting opening 322. The upper portion of the third connecting pipe 36 projects in the direction upward from the upper face 13 of the engine compartment 8. The exhaust gas outlet 8a described above is connected to the third connecting pipe 36.

The engine 15, the first connecting pipe 34, the first exhaust gas treatment device 31, the second connecting pipe 35, the second exhaust gas treatment device 32, and the third connecting pipe 36 are connected in that order in series. Accordingly, exhaust gas from the engine 15 passes through the first connecting pipe 34 and is delivered to the first exhaust gas treatment device 31. At the first exhaust gas treatment device 31, mainly particulate matter, is decreased in the exhaust gas. Next, the exhaust gas passes through the second connecting pipe 35 and is delivered to the second exhaust gas treatment device 32. At the second exhaust gas treatment device 32 mainly NOx, is decreased in the exhaust gas. Thereafter, the purified exhaust gas passes through the third connecting pipe 36 and the exhaust gas outlet 8a and is expelled to the outside.

The bulldozer 1 according to this embodiment of the present invention furnishes the following characteristics.

The first exhaust gas treatment device 31 and the second exhaust gas treatment device 32 are arranged such that the longitudinal direction of each follows the forward-backward direction of the vehicle. For this reason, even though the dimensions of the first exhaust gas treatment device 31 and the second exhaust gas treatment device 32 are substantial in the longitudinal direction, an increase in the dimensions of the engine compartment 8 in the widthwise direction can be avoided. Accordingly, this bulldozer realizes improved performance in treatment of exhaust gas and suppresses the problem of reduced visibility from the cab 7 in the forward direction. More specifically, deterioration in visibility from the cab 7 toward the lower left and right ends of the blade 5 is avoided.

Further, the air cleaner 16 is arranged between the radiator 21 and the exhaust gas treatment unit 17 in the forward-backward direction of the vehicle. Accordingly even though the first exhaust gas treatment device 31 and the second exhaust gas treatment device 32 are disposed in the vertical arrangement, a substantial distance can be maintained between the exhaust gas treatment unit 17 and the radiator 21.

For this reason, the effect of heat from the exhaust gas treatment unit 17 impacting the radiator 21 can be avoided.

Note that conventionally, the air cleaner is arranged behind the exhaust gas treatment device. This is because positioning the exhaust gas treatment device separated from the cab in which the operator sits enables the operator to avoid discomfort due to exhaust gas. If the exhaust gas treatment unit 17 and the air cleaner 16 according to this embodiment of the present invention were of the conventional arrangement, that is to say, if, above the engine, the air cleaner 16 were positioned behind the exhaust gas treatment unit 17, the exhaust gas treatment unit 17 would, in the planar view, project forward of the engine 15.

The exhaust gas treatment unit 17 is heavier in relation to the engine 15. For this reason, if the exhaust gas treatment unit 17 is arranged so as to project forward of the front of the engine 15 weight balance would be disturbed. Disturbed weight balance is not desirable as it causes uncomfortable vibrations and the like. In this embodiment of the present invention the exhaust gas treatment unit 17 is arranged above the engine 15, and forward of the exhaust gas treatment unit 17, the lighter weight air cleaner 16 is attached to the upper face panel of the engine compartment 8. For this reason, the problem of weight balance affecting the engine mounts can be avoided. Note that in this embodiment of the present invention, the exhaust gas treatment unit 17 comes close to the cab 7, however as exhaust gas undergoes high level treatment, the operator does not experience discomfort as in the conventional arrangement.

Part of the air cleaner 16 is positioned forward the engine 15. For this reason, above the engine 15, a substantial space can be maintained for arranging the exhaust gas treatment unit 17.

Part of the air cleaner 16 is arranged directly above the cooling device 22. For this reason, the dimensions of the engine compartment 8 in the forward-backward direction of the vehicle can be reduced.

The air cleaner 16 is supported by the engine compartment 8. For this reason, even though part of the air cleaner 16 is arranged forward the engine 15, the air cleaner 16 can be supported firmly.

The exhaust gas treatment unit 17 is supported by the engine 15. For this reason, the exhaust gas treatment unit 17 can be supported firmly. Further, as the engine 15 and the exhaust gas treatment unit 17 are of the same vibration system, the load on the connecting pipes between the engine 15 and the exhaust gas treatment unit 17 is reduced.

The air cleaner 16 is arranged such that the longitudinal direction thereof is at an inclination relative to the forward-backward direction of the vehicle. For this reason, the dimensions of the engine compartment 8 in the forward-backward direction of the vehicle can be reduced.

Viewed from the side of the vehicle, the first side portion 161 of the air cleaner 16 is arranged so as to overlap with the side panel 113. Accordingly, by opening the side panel 113 the first side portion 161 of the air cleaner 16 can be easily accessed from the opening 114. For this reason, the air cleaner 16 can be of substantial length and can be easily maintained.

The air cleaner 16 is arranged such that an extension line of the center axial line Ax1 of the air cleaner 16 passes through the opening 114. For this reason, by causing the air cleaner 16 to move in the direction of the center axial line Ax1 of the air cleaner 16, the air cleaner 16 can be easily taken out from the opening 114. Specifically, as shown in FIG. 4, viewed from the side of the vehicle, the front portion of the air cleaner 16 overlaps with the first side face 11, however as the axial line Ax1 of the air cleaner 16 is at an inclination, moving the air cleaner 16 along the direction of the axial line enables the air cleaner 16 to be taken out while avoiding the first side face 11. Further, as moving the air cleaner 16 in the axial direction in this way enables the air cleaner 16 to be taken out avoiding the first side face 11, the opening 114 can be of small size.

The exhaust gas port 25 is positioned behind the air suction port 26. For this reason, in comparison to the case in which the exhaust gas port 25 is positioned forward the air suction port 26, the exhaust gas treatment unit 17 can be arranged to the rear. This enables the distance between the radiator 21 and the exhaust gas treatment unit 17 to be expanded.

Although the invention has been described above by reference to an embodiment thereof, the invention is not limited to the embodiment described above. It is therefore understood that numerous modifications and variations can be devised without departing from the scope of the invention.

The configuration of the exhaust gas treatment unit 17 is not limited to the configuration as described above. For example it may be suitable for the first exhaust gas treatment device 31 to be a treatment device other than a diesel particulate matter collection filter. It may be suitable for the second exhaust gas treatment device 32 to be a device other than a selective reducing catalytic device. The first exhaust gas treatment device 31 is not limited to being of a cylindrical external form or the like, and it may be suitable for the first exhaust gas treatment device 31 to be of another form such as elliptically cylindrical or cuboid. The second exhaust gas treatment device 32 not limited to being of a cylindrical external form or the like, and it may be suitable for the second exhaust gas treatment device 32 to be of another form such as elliptically cylindrical or cuboid. Again, it may be suitable for the first through third connecting pipes 34, 35, and 36 to be arranged in positions different to those as described above.

It may be suitable for not only part of the air cleaner 16, but for the entire air cleaner 16, to be positioned forward of the engine 15. It may be also suitable for not only part of the air cleaner 16, but for the entire air cleaner 16, to be positioned directly above the cooling device 22.

It may be suitable for the air cleaner 16 to be arranged such that the longitudinal direction thereof follows the widthwise direction of the vehicle. It may be suitable for the first side portion 161 of the air cleaner 16, viewed from the side of the vehicle, to be arranged so as not to overlap with the side panel 113. It may be suitable for the side panel 113 to be omitted. It may be also suitable for the air cleaner 16 to be arranged such that an extension line of the center axial line Ax1 of the air cleaner 16 does not pass through the opening 114. Again, it may be suitable for the opening 114 to be omitted.

It may be suitable for the air cleaner 16 to be supported by a panel comprising the engine compartment 8. It may be also suitable for the air cleaner 16 to be supported by a vehicle body frame comprising the engine compartment. Further, it may be suitable for the air cleaner 16 to be supported by something other than the engine compartment 8. For example, it may be suitable for the air cleaner 16 to be supported by the engine 15. It may be suitable for the exhaust gas treatment unit 17 to be supported by something other than the engine 15. For example, it may be suitable for the exhaust gas treatment unit 17 to be supported by the vehicle body frame.

It may be suitable for the exhaust gas port 25 to be positioned forward the air suction port 26. It may be suitable for a device other than an oil cooler to be used as a cooling device.

It may be suitable for the layout in the engine compartment 8 to be opposite in the lateral direction, to the layout described above. For example, it may be suitable for the first exhaust gas treatment device 31 to be arranged to the left side and for the second exhaust gas treatment device 32 to be arranged to the right side. It may be suitable for the first side portion 161 of the air cleaner 16 to be arranged to the right side and for the second side portion 162 to be arranged to the left side.

INDUSTRIAL APPLICABILITY

According to the present invention a bulldozer is provided that enables improved performance in the treatment of exhaust gas and suppresses the problem of reduced visibility from the cab in the forward direction.

The invention claimed is:

1. A bulldozer comprising:
a cab;
an engine compartment arranged forward of the cab;
an engine arranged in the engine compartment;
a radiator arranged forward of the engine;
an exhaust gas treatment unit arranged above the engine, the exhaust gas treatment unit having
　a first exhaust gas treatment device arranged such that a longitudinal direction thereof follows a forward-backward direction of the bulldozer, and
　a second exhaust gas treatment device positioned to a side of the first exhaust gas treatment device, the second exhaust gas treatment device arranged such that a longitudinal direction thereof follows the forward-backward direction of the bulldozer; and
an air cleaner entirely arranged between the radiator and the exhaust gas treatment unit in the forward-backward direction of the vehicle.

2. The bulldozer according to claim 1, wherein
at least part of the air cleaner is positioned forward the engine.

3. The bulldozer according to claim 2, further comprising a cooling device arranged behind the radiator and below a top portion of the radiator, with at least part of the air cleaner being positioned directly above the cooling device.

4. The bulldozer according to claim 2, wherein
the air cleaner is supported by a panel of an upper face of the engine compartment.

5. The bulldozer according to claim 4, wherein
the exhaust gas treatment unit is supported by the engine.

6. The bulldozer according to claim 1, wherein
the air cleaner is arranged such that a longitudinal direction thereof intersects with the forward-backward direction of the bulldozer.

7. The bulldozer according to claim 6, wherein
the engine compartment has an opening positioned to a side of the air cleaner and a side panel disposed to enable opening and closing of the opening,
the air cleaner is disposed at an inclination relative to a widthwise direction of the bulldozer,
the air cleaner has a first side portion positioned close to the side panel and a second side portion positioned further from the side panel than the first side portion, and
the first side portion is arranged so as to overlap with the side panel in a side view of the bulldozer.

8. The bulldozer according to claim 7, wherein
the air cleaner is arranged such that an extension line of a center axial line of the air cleaner passes through the opening.

9. The bulldozer according to claim 1, wherein
the engine has an exhaust gas port connected to the exhaust gas treatment unit and an air suction port connected to the air cleaner, and
the exhaust gas port is positioned behind the air suction port.

10. The bulldozer according to claim 3, wherein
the air cleaner is supported by a panel of an upper face of the engine compartment.

11. The bulldozer according to claim 10, wherein
the exhaust gas treatment unit is supported by the engine.

12. The bulldozer according to claim 11, wherein
the air cleaner is arranged such that a longitudinal direction thereof intersects with the forward-backward direction of the bulldozer.

13. The bulldozer according to claim 12, wherein
the engine compartment has an opening positioned to a side of the air cleaner and a side panel disposed to enable opening and closing of the opening,
the air cleaner is disposed at an inclination relative to a widthwise direction of the bulldozer,
the air cleaner has a first side portion positioned close to the side panel and a second side portion positioned further from the side panel than the first side portion, and
the first side portion is arranged so as to overlap with the side panel in a side view of the bulldozer.

14. The bulldozer according to claim 13, wherein
the air cleaner is arranged such that an extension line of a center axial line of the air cleaner passes through the opening.

15. The bulldozer according to claim 2, wherein
the air cleaner is arranged such that a longitudinal direction thereof intersects with the forward-backward direction of the bulldozer.

16. The bulldozer according to claim 15, wherein
the engine compartment has an opening positioned to a side of the air cleaner and a side panel disposed to enable opening and closing of the opening,
the air cleaner is disposed at an inclination relative to a widthwise direction of the bulldozer,
the air cleaner has a first side portion positioned close to the side panel and a second side portion positioned further from the side panel than the first side portion, and
the first side portion is arranged so as to overlap with the side panel in a side view of the bulldozer.

17. The bulldozer according to claim 16, wherein
the air cleaner is arranged such that an extension line of a center axial line of the air cleaner passes through the opening.

18. The bulldozer according to claim 2, wherein
the engine has an exhaust gas port connected to the exhaust gas treatment unit and an air suction port connected to the air cleaner, and
the exhaust gas port is positioned behind the air suction port.

19. The bulldozer according to claim 8, wherein
the engine has an exhaust gas port connected to the exhaust gas treatment unit and an air suction port connected to the air cleaner, and
the exhaust gas port is positioned behind the air suction port.

20. The bulldozer according to claim 6, wherein
the engine has an exhaust gas port connected to the exhaust gas treatment unit and an air suction port connected to the air cleaner, and
the exhaust gas port is positioned behind the air suction port.

* * * * *